Sept. 9, 1958 J. KNOWLES 2,850,921
AUTOMATIC TRANSMISSION
Filed Aug. 15, 1956
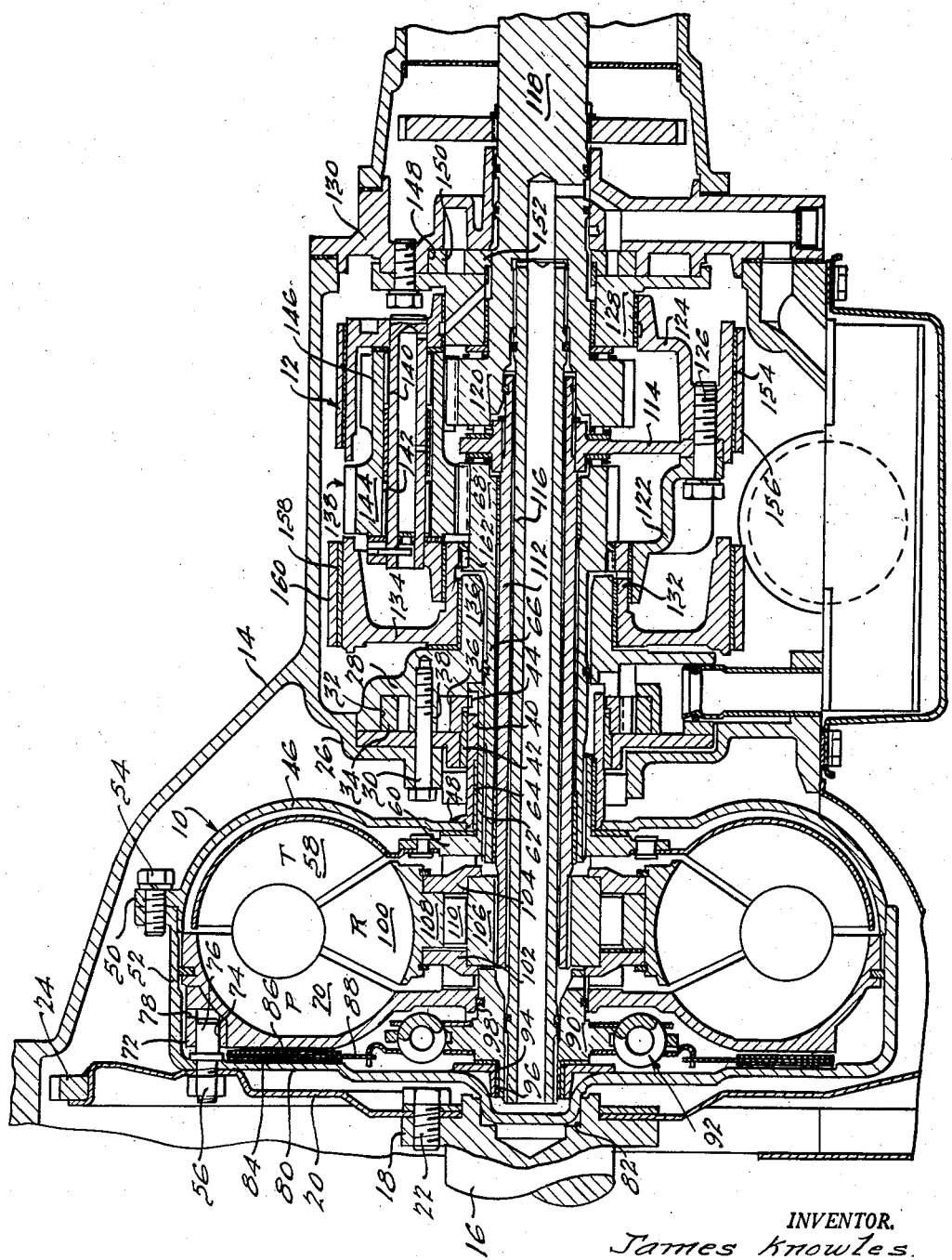
INVENTOR.
James Knowles.
BY Edwin C. McRae
J. R. Faulkner
Donald J. Harrington
ATTORNEYS.

United States Patent Office 2,850,921
Patented Sept. 9, 1958

2,850,921

AUTOMATIC TRANSMISSION

James Knowles, Bloomfield Hills, Birmingham, Mich., assignor to Ford Motor Company, Dearborn, Mich., a corporation of Delaware Application August 15, 1956, Serial No. 604,174

14 Claims. (Cl. 74—677)

My invention relates generally to a new and improved power transmission mechanism and more particularly to a multiple speed power transmission mechanism with control means for effecting an automatic shift from one gear ratio to another.

According to a principal feature of my invention, provision is made for transmitting power from a driving portion of the transmission to a driven portion through a planetary reduction gear unit and for controlling the relative motion of the gear elements of the gear unit to effect forward and reverse operation, said shift controlling means including a direct drive clutch for transmitting power directly from the driving portion to the driven portion of the transmission.

According to another feature of my invention the transmission includes a hydrokinetic torque converter unit having a pump, a turbine and a reactor, the torque acting on the latter during operation being in a direction which is opposite to the direction of the torque acting on the turbine, said shift controlling means being further adapted to selectively brake the reactor member during forward drive operation while permitting the delivery of power from the turbine to the power input member of the gear unit and to brake the turbine while permitting the reactor to transmit a reverse torque to the gear unit to obtain a reverse drive.

In general, the direct drive clutch feature of my improved automatic transmission mechanism comprises a pair of juxtaposed friction surfaces, one of which is formed on an engine driven drum forming a part of the torque converter housing and the other of which is formed on the torque converter pump member. A friction disc is positively connected to a power output portion of the transmission and is disposed between the aforementioned clutch friction surfaces. The converter pump member is movably carried by an engine driven portion of the transmission and is adapted to be shifted axially upon a change in the ratio of the static pressure existing in the converter torus circuit to the static pressure acting externally on the pump member. By preference, the pump member and the above mentioned converter housing define a cavity within which fluid may be admitted to produce the above mentioned externally acting static pressure, said fluid also creating a centrifugal pressure force which acts on the pump member and which neutralizes the opposed centrifugal pressure force exerted on the pump member by the fluid within the converter torus circuit.

The provision of an improved hydrokinetic torque converter transmission of the type above set forth being a principal object of my invention, it is a further object of my invention to provide and automatic transmission having a clutch member capable of effecting changes in the overall transmission gear reduction ratio wherein one of the members of the torque converter unit is adapted to form a portion of the clutch assembly.

It is a further object of my invention to provide a transmission as set forth above wherein the clutch feature is characterized by its simplified construction and may be incorporated into a variety of converter transmission assemblies by conventional manufacturing and assembly techniques.

For the purpose of more particularly describing the principal features of my invention, reference will be made to the accompanying drawing which shows a cross sectional assembly view of the transmission.

The hydrokinetic torque converter unit is designated in the drawing by numeral 10 and the planetary gear unit is generally designated by numeral 12. The hydrokinetic torque converter unit 10 and the gear unit 12 are enclosed by a common transmission housing 14 which may be secured to a vehicle engine in a conventional manner. The engine crankshaft is shown in part in the drawing at 16 and it is provided with a bolt flange 18 to which a flexible fly wheel 20 may be secured, suitable bolts 22 being provided for this purpose. The periphery of the fly wheel 20 may carry an external ring gear 24 which is adapted to drivably engage a starter pinion associated with a conventional electric engine starter motor.

The transmission housing 14 includes a transverse wall 26 which separates the housing 14 into two separate chambers respectively housing the hydrokinetic torque converter unit 10 and the gear unit 12. A pump casing 28 is positively connected to the transverse wall 26 by means of bolts 30 and it defines a pump cavity 32 within which is disposed an internal pump gear 34 and an eccentrically positioned external pump gear 36, the pump casing 28 forming a crescent located in the space between the gears 34 and 36 as shown at 38.

A sleeve 40 is rotatively journaled within a central opening formed in the transverse wall 26, a suitable bushing 42 being provided for this purpose. A positive driving connection between the external pump gear 36 and the sleeve 40 is formed as shown at 44.

The other end of the sleeve 40 is positively connected to the hub of a turbine shroud 46 positioned in the converter housing, said connection being indicated at 48. The outer periphery of the shroud 46 is formed with a flange 50 to which a housing portion or drum 52 is joined by means of bolts 54, the drum 52 in turn being secured to the flexible fly wheel 20 by means of bolts 56.

The hydrokinetic unit 10 includes a bladed turbine member 58 having a hub 60 with an axial extension 62 received within the sleeve 40, a suitable bushing 64 being interposed between the extension 62 on the sleeve 40 to permit relative rotation therebetween. The extension 62 is positively splined to a sleeve shaft 66 which extends to sun gear 68 and which is integrally joined thereto as indicated.

The hydrokinetic converter unit 10 further includes a pump member 70 which cooperates with the turbine member 58 to define a torus fluid circuit. The pump member 70 is received within the aforementioned drum 52 and it is formed with a peripheral shoulder 72 within which is formed a plurality of axially extending pilot openings 74. A separate pilot shaft 76 is received within each opening 74 and by preference the shafts 76 form a part of the bolts 56. The cavity defined by the opening 74 communicates with the exterior through a port 78. The drum 52 is formed with a tranverse wall 80 which may be piloted at the center thereof within a suitable pilot opening 82 formed in the engine crankshaft 16. The wall 80 is further formed with an internally situated friction clutch surface 84.

A second friction clutch surface 86 is formed on the exterior of pump member 70 in juxtaposed relationship with respect to the surface 84, and an annular friction disc 88 is disposed between the clutch surfaces 84 and 86, said disc 88 preferably including suitable lining material on either side thereof as indicated.

The clutch disc 88 is joined to a hub member 90 by means of a conventional damping spring connection generally indicated by numeral 92 said hub being journaled within an adapter 94 which is centrally secured to the wall 80, a suitable bushing 96 being located between the cooperating portions of the hub member 90 and the adapter 94.

The pump member 70 is centrally apertured at 98 to receive therein the hub member 90, said pump member 70 being adapted to move axially with respect to hub member 90.

The hydrokinetic converter unit 10 further includes a reactor member 100 situated between the entrance to the pump 70 and the exit of the turbine member 58, and it includes a hub comprised of a pair of axially spaced adapters 102 and 104 which are supported by an inner race 106 of a one-way brake assembly, said assembly further including an outer race 108 and a plurality of interposed one-way clutch members 110. The inner race 106 is positively splined to sleeve shaft 112 extending to a carrier 114 of the planetary gear unit 12. Another sleeve shaft 116 is concentrically disposed within sleeve shaft 112 and it is positively splined at one end thereof to the hub member 90 and at the other end thereof to a power output shaft 118.

Referring more particularly to the planetary gear portions of the transmission mechanism, the aforementioned sun gear 68 is centered in adjacent relationship with respect to a second sun gear 120 integrally joined to the power output shaft 116. The carrier 114 is comprised of a pair of gear supporting portions 122 and 124 which may be joined in a suitable fashion by bolts 126 as illustrated. The carrier portion 124 is journaled on a stationary adapter 128 secured to an end wall 130 of the transmission casing 15 and the carrier portion 122 is rotatably journaled on an extension 132 of the hub of a brake member 134, said brake member in turn being journaled on an extension 136 of the aforementioned stationary pump casing 38. A compound planet pinion 138 is rotatably supported by the carrier portions 122 and 124 by means of a pinion shaft 140 extending from the carrier portion 122 to the carrier portion 124, suitable needle bearings 142 being interposed between the planet pinion 138 and the shaft 140. The pinion 138 includes a first gear portion 144 engageable with the aforementioned sun gear 138 and a gear portion 136 engageable with the sun gear 120.

The end wall 130 is centrally apertured to receive therein a power output shaft 118 and it is recessed at 148 to define a second pump chamber which is adapted to accommodate a pair of intermeshed pump gears 150 and 152.

The carrier 114 is formed with a brake drum surface 154 and a brake band 156 encircles the same. Similarly, the brake member 134 is formed with a peripheral brake surface 158 about which is positioned a brake band 160. The brake bands 156 and 160 may be selectively energized for the purpose of obtaining a low gear reduction ratio or a reverse reduction ratio as desired.

It will be apparent that the aforementioned pump elements 34 and 36 supply a fluid pressure which is dependent upon engine speed since the input gear element 36 is drivably connected to the engine crankshaft 16. Also, it is apparent that the rear pump gears 150 and 152 are adapted to supply a pump pressure which is dependent only upon vehicle speed. These separate pump pressures may be utilized in a control circuit for controlling the operation of the planetary gear elements and the clutch shown at 84, 86, and 88.

In operation, it is possible to obtain either of two forward drive reduction gear ratios in addition to the reverse ratio. During forward drive, power is delivered from the engine crankshaft 16 through a flexible fly wheel 20 and through the connections 76 to the pump member 70. This creates a torus flow which causes torque to be imparted to the turbine member 58 and to the sun gear 68 which is joined to the hub 60 of the turbine member 58 by means of sleeve 66. The brake band 156 is energized during low speed operation thereby holding the carrier 114. The sun gear 68 thus drives the planet gear portion 134 which in turn causes the planet gear portion 136 to drive the sun gear 120 and the integrally joined power output shaft 118. According to one preferred embodiment of my invention, the gear reduction ratio during low speed operation is 1.59 so that the overall torque multiplication ratio is equal to 1.59 times the converter torque ratio. To obtain direct drive, the ratio of the static pressure in the torus circuit defined by the converter members to the static pressure within drum 52 on the left side of pump member 70, as viewed in the drawing, may be increased until the pump member 70 is shifted axially into engagement with the clutch disc 88. This causes the clutch disc 88 to drivably engage the transverse wall 80 of the drum 52 thus accommodating the transfer of power from the engine driven fly wheel 20 to shaft 116 and to the power output shaft 118 thus bypassing the planetary gear portion of the transmission mechanism.

To obtain reverse drive, the brake band 160 is energized thus holding brake member 134 stationary and the brake band 156 is simultaneously released. The brake member 134 is positively connected to sun gear 68 as shown at 162 thus holding the turbine member stationary. Since the carrier member 114 of the planetary unit 12 is no longer held stationary, the reaction torque on the reaction member 100 of the converter unit 10 causes carrier member 114 to rotate in a reverse direction. Since sun gear 68 is held stationary, the rotation of the carrier 114 will be accompanied by a reverse driving motion of the sun gear 120 and the power output shaft 118. By preference, the torque multiplication ratio of the transmission in reverse is equal to approximately 2.50 so that the total torque multiplication ratio for the transmission is equal to 2.50 times the converter torque ratio.

It is thus apparent that I have provided a hydrokinetic transmission mechanism of simplified construction wherein the reverse torque normally applied to the reaction member of the hydrokinetic unit may be utilized to obtain reverse drive thus eliminating the need for a separate reverse gear and wherein direct drive may be obtained by directly clutching the pump member to the power output portions of the mechanism. No special clutch plates or clutch actuators are required since the existing transmission components are effectively utilized as the constituent elements of the direct drive clutch.

Although I have particularly described one preferred embodiment of my invention, I contemplate that variations therein may be made without departing from the scope of the invention as defined by the following claims.

What I claim is:

1. In a multiple speed power transmission mechanism for delivering power from a driving shaft to a driven shaft, a hydrokinetic unit comprising a pump member and a turbine member, said members collectively defining at least in part a fluid circuit for accommodating the circulation therethrough of a hydraulic medium, a positive connection between said pump member and said driving shaft, an epicyclic gear unit comprising a plurality of compounded gear elements, one of said gear elements being connected to said driven shaft, a second of said gear elements being connected to said turbine member, brake means for selectively restraining the motion of a third of said gear elements and for absorbing the torque reaction accompanying the transmission of torque through said gear unit whereby a first driving speed ratio is obtained, clutch means for directly coupling said driven shaft and said driving shaft to obtain a second driving speed ratio, and servo means for energizing said clutch means, said servo means being defined in part by said pump member.

2. A power transmission mechanism comprising a driving shaft, a driven shaft, a gear unit including a plurality of compounded gear elements, a hydrokinetic unit comprising a pump member and a turbine member defining at least in part a fluid path for accommodating the circulation therethrough of a hydraulic medium, said pump member being positively connected to said driving shaft, said turbine member being drivably connected to one portion of said gear unit, said driven shaft being connected to a second portion of said gear unit, brake means for selectively holding another portion of said gear unit to accommodate the delivery therethrough of a driving torque whereby a first driving speed ratio is obtained, clutch means for forming a driving connection between said driving and driven shafts through said gear unit and for establishing a second driving speed ratio, and servo means for selectively energizing said clutch means, said servo means being defined in part by said pump member, the latter being adapted to be hydraulically loaded to produce an energizing force for said clutch means.

3. In a power transmission mechanism comprising a driving shaft, a driven shaft, an epicyclic gear unit including a primary and a secondary sun gear, a planet gear carrier, planet gears carried by said carrier in engagement with said sun gears, a hydrokinetic torque converter comprising a pump member, a turbine member and a reactor member, said members defining a hydrokinetic fluid circuit, said pump member being mechanically connected to said driving shaft, said turbine member being connected to said primary sun gear, said driven shaft being positively connected to said secondary sun gear, said reactor member being connected to said carrier, clutch means for forming a positive torque delivery path between said driving shaft and said driven shaft, brake means for selectively holding said carrier and for restraining movement of the same and servo means for energizing said clutch means, said pump member being axially shiftable and defining in part said servo means, said pump member being adapted to be hydraulically loaded in an axial direction to actuate said servo means.

4. In a power transmission mechanism comprising a driving shaft, a driven shaft, an epicyclic gear unit comprising first and second gears of different pitch diameters, a planet gear carrier, planet gears carried by said carrier in engagement with said sun gears, a hydrokinetic torque converter comprising a pump member, a turbine member and a reactor member, said converter members defining a hydrokinetic fluid circuit, said pump member being positively coupled to said driving shaft, said turbine member being connected to said first gear, said driven shaft being connected to said second gear, said reactor member being connected to said carrier, clutch means for forming a positive powered connection between said driving shaft and said driven shaft, first brake means for holding said carrier and for restraining movement of the same, second brake means for selectively braking said turbine member and said first gear, and servo means for selectively energizing said clutch means, said servo means being defined in part by said pump member, the latter being adapted to be hydraulically loaded to produce an energizing force for said clutch means.

5. In a power transmission mechanism comprising a driving shaft, a driven shaft, a gear unit, a hydrokinetic unit including a pump member and a turbine member, said turbine member being connected to a portion of said gear unit, another portion of said gear unit being connected to said driven shaft, said pump member being connected to said driving shaft, clutch means for selectively clutching together said driving shaft and a portion of said gear unit for conjoint movement, and a servo means for energizing said clutch means, said pump member having axially shiftable portions and defining in part said servo means whereby said clutch means may be energized by hydraulically loading said pump member in an axial direction.

6. In a power transmission mechanism comprising a driving member, a driven member, a gear unit, a hydrokinetic unit including a pump member and a turbine member, said turbine member being connection to a portion of said gear unit, another portion of said gear unit being connected to said driven member, said pump member being connected to said driving member, clutch means for selectively clutching said driving member and said pump member to said driven member, said clutch means including clutch surfaces formed on said pump member and on said driving member in juxtaposed relationship, a clutch member positively connected to said driven member including a friction element situated between said friction surfaces, and means for hydraulically loading said pump member to effect an axial shifting movement of the same thereby urging said friction surfaces into engagement with said friction element to provide a driven connection between said driving member and said pump member.

7. In a power transmission mechanism comprising a driving portion, a driven portion, a gear unit, a hydrokinetic power transmitting unit including a pump member and a turbine member defining a hydrokinetic fluid circuit, said turbine member being connected to one portion of said gear unit, another portion of said gear unit being connected to said driven portion, a mechanical connection between said driving portion and said pump, said mechanical connection being adapted to accommodate an axial shifting movement of said pump relative to said driving portion, the latter defining in part a cylindrical housing, a clutch member including a friction element disposed between said housing and said pump, said driven portion including a power output shaft and a coupling shaft interconnecting said power output shaft and said clutch member, and means for subjecting said pump member to an axial shifting force to provide a driving connection through said clutch member from said driving portion to said power output shaft.

8. The combination set forth in claim 7 wherein said driving portion includes a cylindrical wall surrounding said pump, said pump member being axially shiftable with respect to said driving portion with the periphery thereof in sealing engagement with said surrounding cylindrical wall and wherein said clutch member includes a hub portion extending axially through said pump member in concentric relationship therewith.

9. In a power transmission mechanism comprising a a driving portion, a driven portion, a gear unit, a hydrokinetic power transmitting unit including a pump member and a turbine member defining at least in part a hydrokinetic fluid circuit, said turbine member being connected to one portion of said gear unit, another portion of said gear unit being connected to said driven portion, a mechanical connection between said driving portion and said pump member, said connection being adapted to accommodate a relative axial shifting movement of said pump and said driving portion, the latter defining in part a cylindrical wall surrounding said pump member, a clutch member including a friction element disposed between said housing and said pump, said driven portion including a power output shaft and a coupling shaft interconnecting said power output shaft and said clutch member, and means for subjecting said pump member to an axial shifting force to provide a driving connection through said clutch member from said driving portion to said power output shaft, said pump member being axially shiftable with respect to said driving portion with the periphery thereof in sealing engagement with said cylindrical wall and wherein said clutch member includes a hub portion extending axially through said pump member in concentric relationship therewith.

10. In a power transmission mechanism, a driving member, a driven member, a hydrokinetic unit comprising a pump member and a turbine member, said pump and turbine members defining at least in part a hydrokinetic fluid circuit, a gear reduction unit having a portion connected to said driven member, coupling means for drivably connecting said pump member and said driving member with provision for accommodating a relative axial shifting movement of said pump member with respect to said driving member, said turbine member being connected to another portion of said gear unit, and clutch means for directly connecting said driving and driven members including a friction member disposed adjacent said driving member, an intermediate shaft interconnecting said driven member and said friction member, and means for selectively varying the fluid pressure within said fluid circuit to effect an axial shifting movement of said pump member, said pump member drivably engaging said friction member upon movement thereof in one direction to complete a direct power flow path between said driving and driven members.

11. In a power transmission mechanism, a driving member, a driven member, a hydrokinetic unit comprising a pump member and a turbine member, said pump and turbine members defining at least in part a hydrokinetic fluid circuit, a gear reduction unit having a portion thereof connected to said driven member, means for transmitting driving torque from said driving member to said pump member while accommodating a relative axial shifting movement of the latter, said turbine member being connected to another portion of said gear unit, clutch means for directly connecting said driving and driven members including a friction member disposed adjacent said driving member, and means for selectively pressurizing said pump member to effect an axial shifting movement of the same thereby providing a direct driving connection between said driving and driven members.

12. In a power transmission mechanism, a driving member, a driven member, a hydrokinetic unit comprising a pump member and a turbine member and defining in part a first power delivery path, a gear having a portion thereof connected to said driven member, said hydrokinetic unit and said gear unit defining a second power delivery path, means for drivably coupling said pump member and said driving member while accommodating a relative axial shifting movement between the same, said turbine member being connected to another portion of said gear unit, clutch means for connecting said driving member to a portion of said gear unit to establish a second power delivery path between said driving and driven members, servo means for energizing said clutch means, said servo means being defined in part by the pump member, and means for hydraulically loading said pump member in an axial direction thereby creating a fluid pressure force capable of shifting the latter and energizing said clutch means.

13. In a power transmission mechanism, a driving member, a driven member, a hydrokinetic unit comprising a pump member, a reactor member and a turbine member, said pump, reactor and turbine members defining a hydrokinetic fluid circuit, a gear reduction unit having a portion connected to said driven member, means for delivering driving torque from said driving member to said pump member while accommodating a relative axial shifting movement of the same, said turbine member being connected to a second portion of said gear unit, said reactor member being connected to a third portion of said gear unit, means for alternately and selectively braking said reactor member and said turbine member to accommodate the transmission of power through said gear unit in one direction and in the opposite direction respectively, and clutch means for directly coupling said driving member to said driven member, said clutch means including a clutch surface carried by said pump member, a friction member positively connected to said driven member, and means for hydraulically loading said pump member to effect an axial shifting movement of the same and to create a direct driving connection between said driving and driven members through said friction member.

14. The combination as set forth in claim 13 wherein said clutch means is further comprised of a clutch disc disposed between said driving member and said pump member, said friction member being carried by said clutch disc in axially adjacent relationship with respect to said pump member and said driving member, and an intermediate shaft interconnecting said driven member and said clutch disc.

References Cited in the file of this patent

UNITED STATES PATENTS

| | | |
|---|---|---|
| 2,324,733 | Smirl | July 20, 1943 |
| 2,695,533 | Pollard | Nov. 30, 1954 |

FOREIGN PATENTS

| | | |
|---|---|---|
| 668,839 | France | July 22, 1929 |

UNITED STATES PATENT OFFICE
CERTIFICATE OF CORRECTION

Patent No. 2,850,921  
September 9, 1958

James Knowles

It is hereby certified that error appears in the printed specification of the above numbered patent requiring correction and that the said Letters Patent should read as corrected below.

Column 3, line 29, for "116" read -- 118 --; line 34, for "15" read -- 14 --; line 44, for "138" read -- 68 --; same line 44, for "136" read -- 146 --; column 4, line 6, for "136" read -- 146 --; column 5, line 45, for "sun" read -- first and second --.

Signed and sealed this 11th day of October 1960.

(SEAL)

Attest:
KARL H. AXLINE
Attesting Officer

ROBERT C. WATSON
Commissioner of Patents